(12) United States Patent
Scott

(10) Patent No.: US 8,424,847 B2
(45) Date of Patent: Apr. 23, 2013

(54) PASSIVE MARINE EQUIPMENT RECOVERY DEVICE

(75) Inventor: Gary Lee Scott, Richmond, TX (US)

(73) Assignee: Geokinetics Acquisition Company, Houston, TX (US)

( * ) Notice: Subject to any disclaimer, the term of this patent is extended or adjusted under 35 U.S.C. 154(b) by 623 days.

(21) Appl. No.: 12/584,298

(22) Filed: Sep. 3, 2009

(65) Prior Publication Data

US 2011/0049449 A1 Mar. 3, 2011

(51) Int. Cl.
*B66D 3/04* (2006.01)

(52) U.S. Cl.
USPC .......................................... 254/391; 254/389

(58) Field of Classification Search .................. 254/389, 254/391
See application file for complete search history.

(56) References Cited

U.S. PATENT DOCUMENTS

| 2,903,718 | A | * | 9/1959 | Wright, Jr. ....................... 441/10 |
| 3,667,417 | A | * | 6/1972 | Clinkenbeard .................. 114/51 |
| 3,842,780 | A | * | 10/1974 | Allens et al. ............. 114/230.23 |
| 5,231,952 | A | * | 8/1993 | Tenniswood ................... 116/210 |
| 5,605,481 | A | * | 2/1997 | Van Raden ....................... 441/25 |
| 5,616,059 | A | * | 4/1997 | Solomon .......................... 441/11 |
| 7,222,840 | B1 | * | 5/2007 | Stepper ......................... 254/391 |

* cited by examiner

*Primary Examiner* — Emmanuel M Marcelo
(74) *Attorney, Agent, or Firm* — Karen Bryant Tripp

(57) ABSTRACT

A system for retrieving a device from the bottom of a body of water includes a clamp configured to be slidably affixed to the device above the water bottom. The clamp has a selectively engageable lock to fix a position of the clamp on the device. A line ratchet is coupled to the clamp. A line is disposed through the line ratchet. A first flotation device is coupled to one end of the line. A second flotation device is coupled to the other end of the line. The system includes means for applying tension to the line disposed proximate the second flotation device. The line ratchet is arranged to enable movement of the line therethrough toward the means for applying tension, and is also arranged to substantially prevent motion therethrough in the opposite direction.

12 Claims, 4 Drawing Sheets

US 8,424,847 B2

PASSIVE MARINE EQUIPMENT RECOVERY DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of equipment such as cables and conduits deployed on the bottom of a body of water. More specifically, the invention relates to devices for recovering such cables or conduits after they have been deployed on the water bottom for a selected length of time.

2. Background Art

The invention is related to a device that is intended to be attached to equipment or material, e.g., a seismic sensor cable or a conduit, disposed on the bottom of a body of water such as a lake or the ocean. When so disposed, recovery can be difficult due to the device being covered with ocean bottom material. As a result, recovery of the equipment can be a slow difficult process. Recovery of the equipment requires that the equipment is pulled laterally and axially out of the entrapping bottom sediments. The equipment will eventually come out of the bottom sediments if pulled on with sufficient stresses and for a long enough period of time. A difficulty with the foregoing recovery method is that the equipment is often damaged from the stresses applied and personnel and recovery equipment spend a substantial amount of time pulling on the equipment to dislodge it from the water bottom sediment rather than attending to the other duties.

Accordingly, there exists a need for better methods and devices for recovering equipment deployed on the bottom of a body of water.

SUMMARY OF THE INVENTION

A system according to one aspect of the invention for retrieving a device from the bottom of a body of water includes a clamp configured to be slidably affixed to the device above the water bottom. The clamp has a selectively engageable lock to fix a position of the clamp on the device. A line ratchet is coupled to the clamp. A line is disposed through the line ratchet. A first flotation device is coupled to one end of the line. A second flotation device is coupled to the other end of the line. The system includes means for applying tension to the line disposed proximate the second flotation device. The line ratchet is arranged to enable movement of the line therethrough toward the means for applying tension, and is also arranged to substantially prevent motion therethrough in the opposite direction.

A method for retrieving a device disposed on the bottom of a body of water according to another aspect of the invention includes slidably affixing a cable clamp to a part of the device disposed above the water bottom. The cable clamp is moved proximate the water bottom. The clamp is locked in place on the device. Lifting force is applied to one end of a line. The line is functionally coupled to the clamp through an element enabling movement of the line in only one direction. Lifting force is applied to the other end of the line. The line is retracted from one of the ends thereof. The retracting includes moving the line through the element.

Other aspects and advantages of the invention will be apparent from the following description and the appended claims.

DETAILED DESCRIPTION

Figure 1:
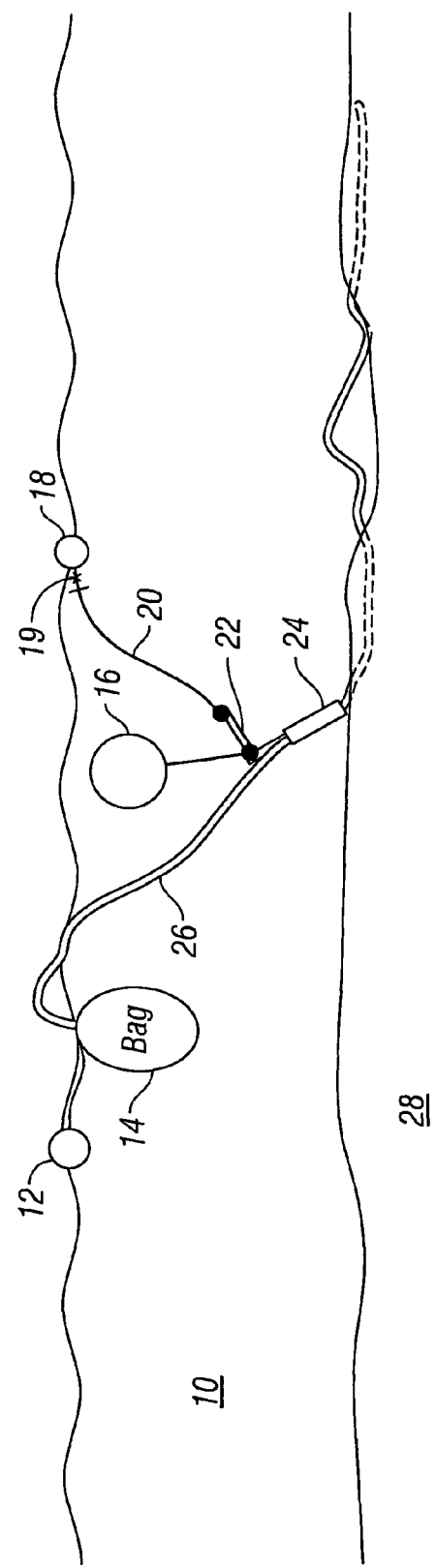
FIG. 1 shows an example water bottom device retrieval system according to the invention.

An example system for retrieving devices deployed on the bottom of a body of water is shown schematically in FIG. 1. A device, such as a cable or conduit 26 may be deployed on the bottom of a body of water 10 such as a lake or the ocean. The cable or conduit 26 (referred to for convenience hereinafter as the "cable") may be, for example, a seismic sensor cable. After the cable 26 has been deployed for a selected length of time, parts of the cable 26 may become partially or totally buried by water bottom sediment 28. The weight of such sediment may make retrieval of the cable 26 by pulling upwardly on its axial end difficult and may risk breakage of or damage to the cable 26 by reason of excessive axial tension required to lift the cable 26 from the sediment 28.

The present system may include a first floatation device such as a buoy 12 coupled to a storage element 14. The storage element 14 may be a bag or a reel (a bag is shown in FIG. 1) and is configured to store portions of the cable 26 that are lifted from the sediment 28 and water bottom using the system. The lifted portions of the cable 26 may be manually inserted into the storage element, or the storage element 14 may include automatic devices (not shown) for storing the lifted cable 26.

A second floatation device such as a buoy 18 may be coupled proximate one end of a lifting line, rope or cable 20 (hereinafter for convenience referred to as the "line"). The line 20 may be used to apply lifting force to the cable 26 by pulling on or near the end of the line 20 proximate the second floatation device 18. Pulling may be performed by a winch (not shown) or similar device. The winch (not shown) may be associated with the second buoy 18, or may be on a vessel (not shown). In the latter example, after the vessel mounted winch (not shown) is used to apply tension to the line 20, the vessel (not shown) may be disconnected from the line 20 and allowed to attend to other functions. The second buoy 18 provides a location of the upper end of the line 20 for later retrieval as needed.

The line 20 may be functionally coupled to a cable clamp 24 (explained below in more detail with reference to FIGS. 2 through 5). When axial tension is applied to the line 20, the axial tension is transferred to the cable 26 through the cable clamp 24. Such axial tension tends to lift the cable 26 from the sediment 28, yet avoids applying large axial tension directly on the cable 26.

In the present example, the line 20 may be coupled to the cable clamp 24 using a one way motion elements such as a ratchet 22 or similar device to limit motion of the line 20 to one direction therethrough. As the line 20 is tensioned, the line 20 moves through the ratchet 22. The other end of the line 20 may be coupled to a third floatation device or buoy 16. As the tension on the line 20 is increased, the third flotation device 16 may be pulled beneath the water surface, depending on the weight of the sediment 28 covering the cable 26. The tension on the line 20 may continue to be applied until the third buoy 16 moves proximate the ratchet 22. The system may then be allowed to remain in such condition. During such time, the buoyant force exerted by the third buoy 16 will tend to lift the ratchet 22 and the connected cable clamp 24, thus lifting the cable 26 from the sediment 28. Lifting of the part of the cable 26 coupled to the clamp 24 may be considered completed when the third flotation device 16 becomes visible at the water surface.

In using the present system, the cable clamp 24 is affixed to the exterior of the cable 26 at a location proximate the water surface, typically from a vessel (not shown). The line 20 will be fully extended so that the cable clamp 24 may move freely along the exterior of the cable until it reaches the portion of the cable 26 resting on the water bottom or proximate part of the cable 26 buried under sediment 28. As will be further explained below with reference to FIGS. 2 through 5, a locking device in the cable clamp 24 may then be applied so that the clamp 24 is no longer free to move along the cable 26. At such time, the line 20 may be tensioned as explained above, such that in combination the buoyant force of the second flotation device 16 and the third flotation device 18 apply lifting force to the cable clamp 24 to urge the cable 26 from under the sediment 28.

Figure 2:
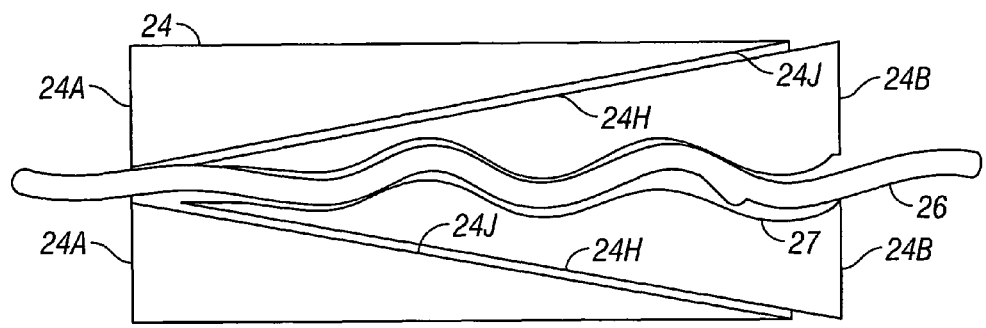
FIG. 2 shows internal components of an example cable or conduit clamp according to the invention.

An example locking device for the cable clamp 24 is shown schematically in FIG. 2. The locking device may include two or more first wedge segments 24B made, for example of plastic such as one sold under the trademark DELRIN, which is a registered trademark of E.I. DuPont de Nemours & Co., Wilmington Del. The first wedge segments 24B may define a serpentine opening 27 for receiving the cable 26 therein. The first wedge segments have a generally tapered exterior surface 24H configured to cooperate with a corresponding interior surface 24J of second wedge segments 24A. The first 24B and second 24A wedge segments may be disposed in a housing (FIGS. 3 and 4), such that when longitudinal force is applied to the first wedge segments 24B, they interact with the second wedge segments 24A to laterally compress against the cable 26 in the opening 27. Thus, the cable 26 is no longer free to move within the opening 27. A serpentine opening such as shown at 27 may be preferable to a straight opening in some examples because the force exerted by pulling on the cable clamp (24 in FIG. 1) may be distributed over a longer axial segment of the cable 26, thereby reducing risk of damage to the cable 26. The cable in the serpentine state will apply the loading force to the center components of the cable superiorly to that of the straight cable in a clamp. The distribution radial of the forces between the outer jacket (not shown separately) of the cable 26 and to the center components (e.g., electrical conductors) with better prevent damage to the cable 26.

Figure 3:
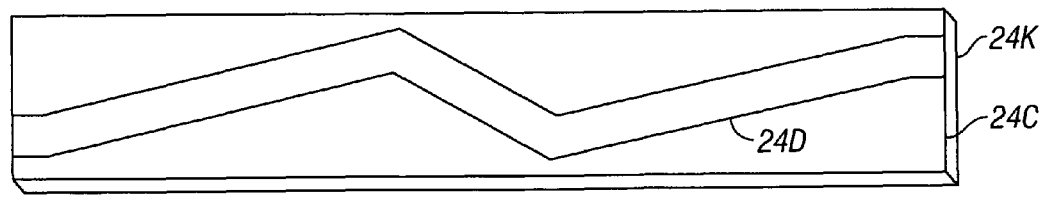
FIG. 3 shows an example opening in a housing of the cable or conduit clamp.

The housing is shown in FIG. 3 at 24C. The housing 24C may be a generally closed structure made from high strength material such as steel or aluminium. The housing 24C may include a serpentine opening 24D in one face thereof to enable affixing the cable clamp (24 in FIG. 1) onto the cable (26 in FIG. 1). The opening 24D may be positioned to correspond to the opening in the second wedge segments (24B in FIG. 2). The wedge segments (24A, 24B in FIG. 2) may be inserted into the housing through an opening 24K in the longitudinal end of the housing 24C as shown in FIG. 3. In some examples, clamps, doors or baffles (not shown in FIG. 3) may be used to cover all or part of the opening 24D after insertion of the cable 26 to ensure that the clamp 24 remains affixed to the cable 26.

Figure 4:
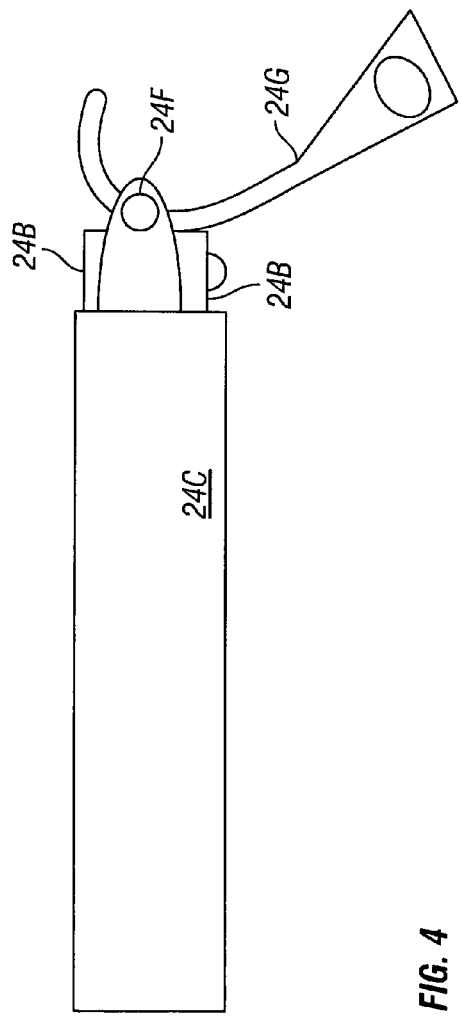
FIG. 4 shows a side view of the cable/conduit clamp of FIG. 3 including an actuator.
Figure 5:
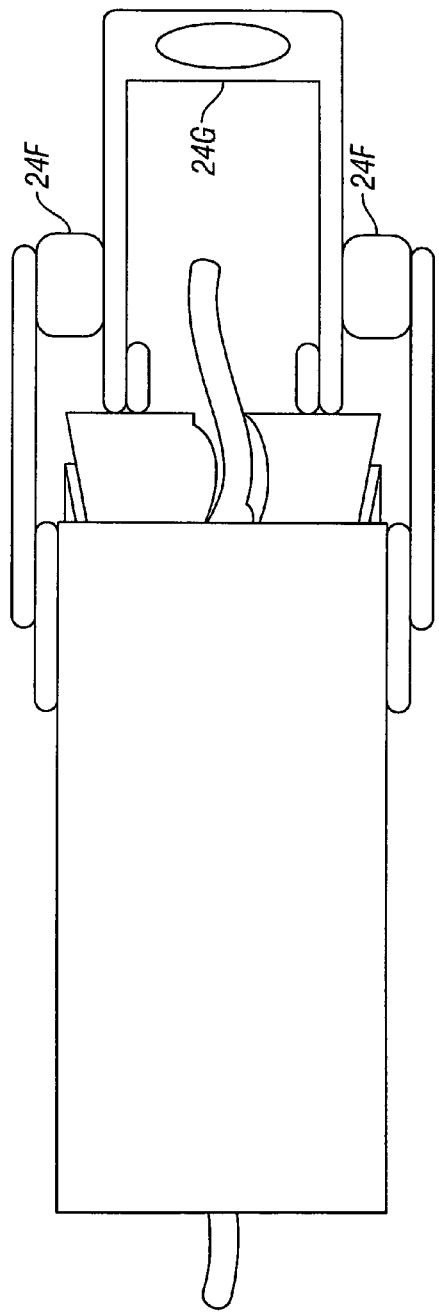
FIG. 5 shows a top view of the cable/conduit clamp of FIG. 3.

FIG. 4 shows a side view of the assembled cable clamp 24. The first wedge segments 24B can be seen protruding from the longitudinal end of the housing 24C. A cam mechanism 24F is functionally coupled to a pull handle 24G. The pull handle 24G is coupled to the line (20 in FIG. 1). When tension is applied to the line (20 in FIG. 1) and thus to the pull handle 24G, the pull handle 24G rotates the cam mechanism 24F to longitudinally urge the first wedge segments 24B into the housing 24C. As the first wedge segments 24B are so urged, they interact with the second wedge segments as explained with reference to FIG. 2 to cause the first wedge segments 24B to tightly grip the cable (26 in FIG. 1). A top view of the cable clamp 24 showing the cam mechanism 24F is shown in FIG. 5.

Figure 6:
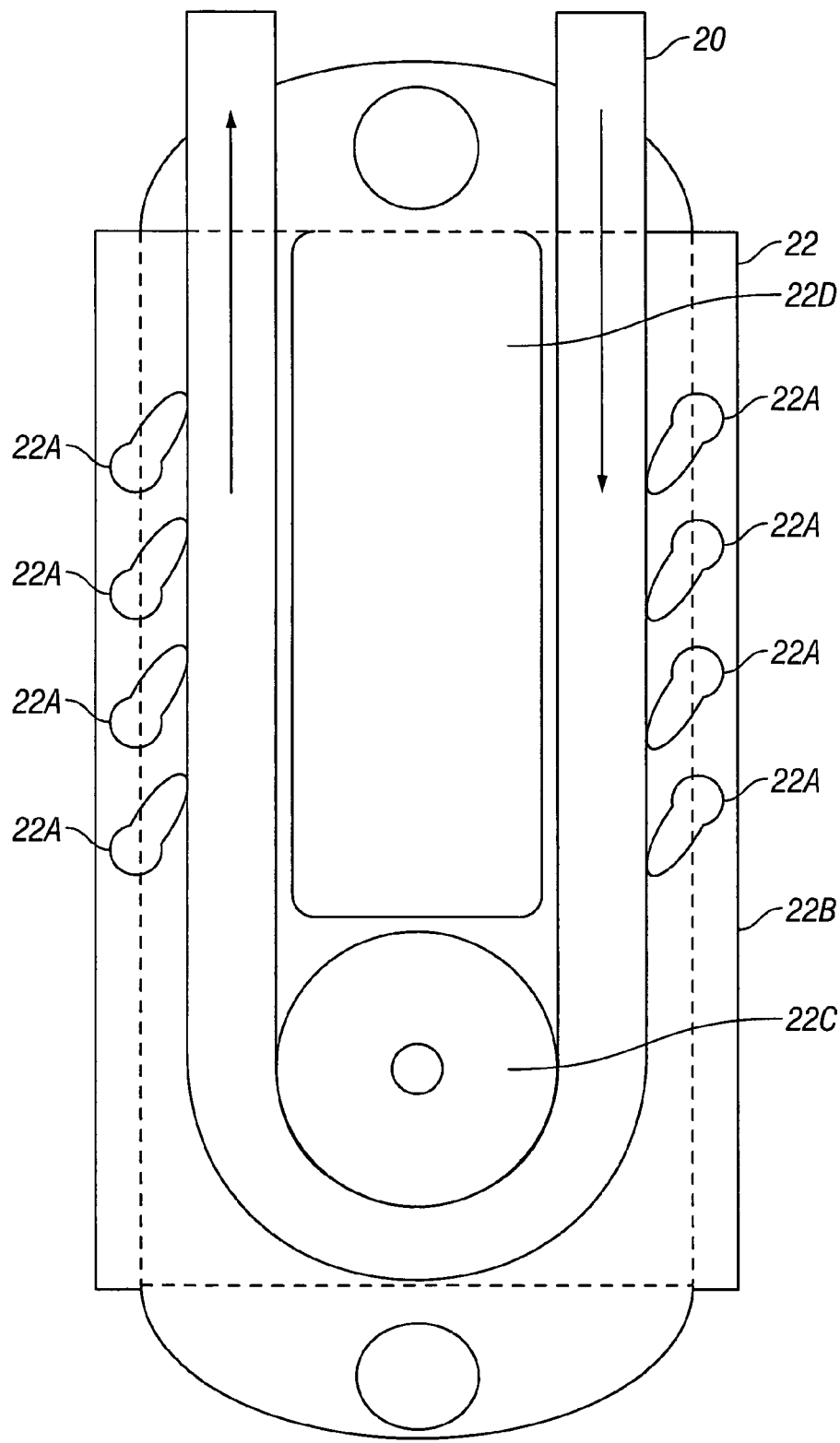
FIG. 6 shows an example line of cable ratchet.

FIG. 6 shows a cut away view of one example of the ratchet 22. A sheave 22C and an insert 22D may be disposed in a housing 22B such that a path or channel for the line 20 may be defined. A plurality of sprags 22A or similar one way locking features may be affixed to the interior of the housing 22B such that the line 20 is free to move in the direction indicated by the arrows, and is substantially stopped from moving in the opposite direction.

As explained above with reference to FIG. 1, when the system is deployed, the cable clamp 24 may be affixed to the exterior of the cable 26 and allowed to slide along the cable 26 to the water bottom. The line 20 may then be tensioned. Such tension will lock the locking mechanism in the cable clamp explained with reference to FIGS. 2 through 5. Continued tension on the line 20 will cause the line to move so that the third buoy 16 is moved toward the cable clamp. Buoyant force of the third buoy will eventually lift the cable clamp with the cable attached.

The foregoing process may be repeated by releasing locking mechanism on the cable clamp, releasing the line and allowing the cable clamp once again to slide to the water bottom. Alternatively, a plurality of additional cable clamps, lines and ratchets may be attached to other parts of the cable.

A cable retrieval device according to the invention may increase efficiency of retrieval operations and may reduce risk of damage to devices disposed on the bottom of a body of water as contrasted with methods know in the art that include only pulling on an axial end of the device on the water bottom.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for retrieving a device from the bottom of a body of water, comprising:
   a clamp configured to be slidably affixed to the device above the water bottom, the clamp having a selectively engageable lock to fix a position of the clamp on the device;
   a line ratchet coupled to the clamp;
   a line disposed through the line ratchet;
   a first flotation device coupled to one end of the line;
   a second flotation device coupled to the other end of the line;
   means for applying tension to the line disposed proximate the second flotation device, wherein the line ratchet is arranged to enable movement of the line therethrough toward the means for applying tension, the line ratchet arranged to substantially prevent motion therethrough in the opposite direction.

2. The system of claim 1 wherein the cable clamp comprises a housing having an opening therein to enable insertion of the device into the housing.

3. The system of claim 1 wherein the selectively engageable lock comprises wedge segments inserted through an opening in a longitudinal end of the housing, and a cam configured to move the wedge segments longitudinally into the housing, the wedge segments having tapered exterior surfaces configured to laterally compress when the wedge segments are moved longitudinally into the housing.

4. The system of claim 3 wherein the cam is operated by a lever coupled to the line, such that when the means for applying tension is operated, the lock is engaged.

5. The system of claim 1 further comprising a storage element coupled to a third flotation device, the storage element configured to hold portions of the device retrieved from the water bottom.

6. The system of claim 5 wherein the storage element comprises a bag.

7. The system of claim 1 wherein the device comprises a seismic sensor cable.

8. A method for retrieving a device disposed on the bottom of a body of water, comprising:
   slidably affixing a cable clamp to a part of the device disposed above the water bottom;
   moving the cable clamp proximate the water bottom;
   locking the clamp in place on the device;
   applying lifting force to one end of a line, the line functionally coupled to the clamp through an element enabling movement of the line in only one direction;
   applying lifting force to the other end of the line; and
   retracting the line from one of the ends thereof, the retracting comprising moving the line through the element.

9. The method of claim 8 further comprising, upon movement of the cable clamp proximate the water surface, storing part of the device lifted from the water bottom.

10. The method of claim 9 further comprising:
    repeating the moving the cable clamp;
    repeating the locking the clamp;
    repeating the applying lifting force to each end of the line; and
    repeating the retracting the line.

11. The method of claim 8 wherein the lifting force comprises buoyant force.

12. The method of claim 8 wherein the locking comprises frictionally engaging the device.

* * * * *